UNITED STATES PATENT OFFICE.

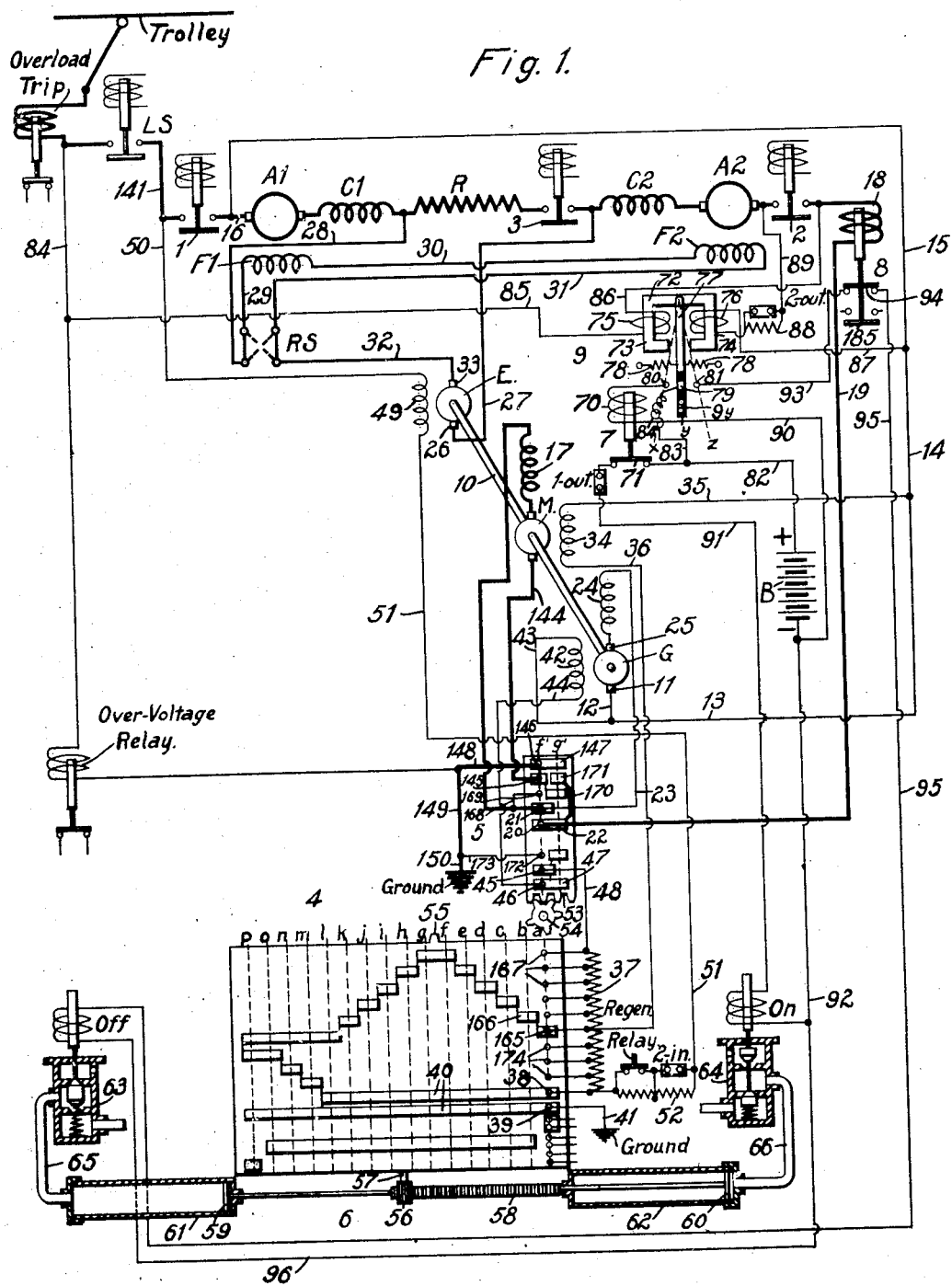

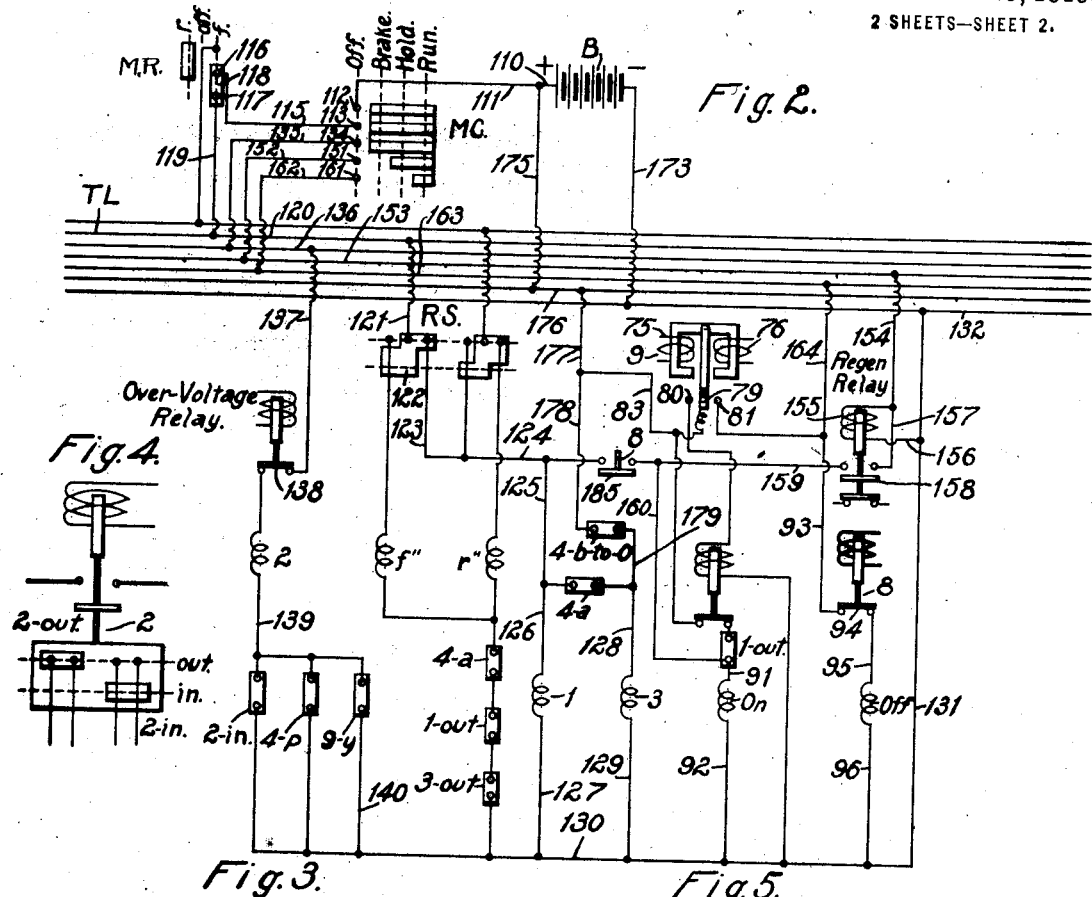
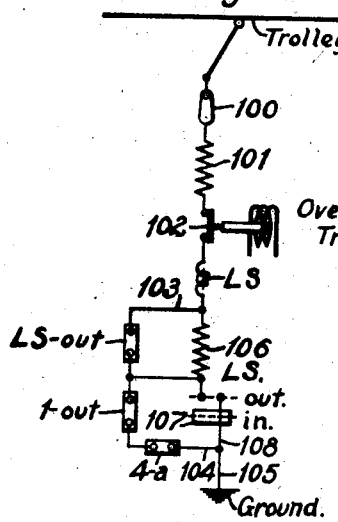
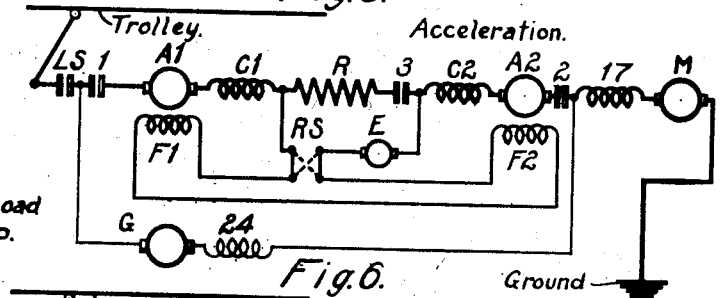
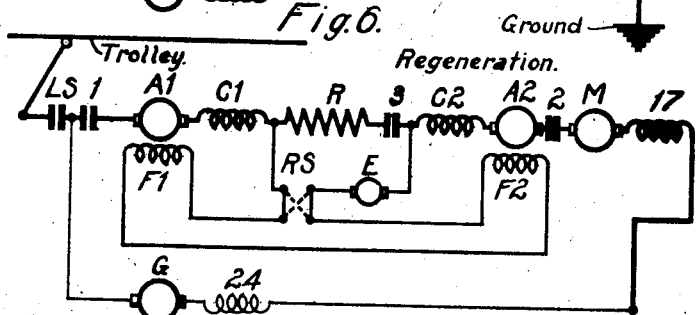

ARTHUR J. HALL AND LAURENCE M. PERKINS, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

1,324,814.      Specification of Letters Patent.      Patented Dec. 16, 1919.

Application filed August 4, 1916. Serial No. 113,114.

*To all whom it may concern:*

Be it known that we, ARTHUR J. HALL, a subject of the King of Great Britain, and a resident of Wilkinsburg, in the county of Allegheny and State of Pennsylvania, and LAURENCE M. PERKINS, a citizen of the United States, and a resident of Wilkinsburg, in the county of Allegheny and State of Pennsylvania, have invented a new and useful Improvement in Systems of Control, of which the following is a specification.

Our invention relates to systems of control and especially to the control of electric railway motors and the like during both accelerating and the regenerative periods.

Various systems of direct-current regenerative control have been proposed wherein combinations of variable resistors and auxiliary sources of energy in connection with the main field windings have been employed for effecting regenerative operation of the machine, for example, the system disclosed in a co-pending application of R. E. Hellmund, Serial No. 44,443, filed August 9, 1915, patented April 1, 1919, No. 1,298,706, and assigned to the Westinghouse Electric & Manufacturing Company, wherein a resistor is connected in series-circuit relation, with the regenerating armature across the supply circuit, and a series circuit, including the main field winding or windings and an auxiliary source of energy, is connected across the resistor. Furthermore, it has been previously proposed to employ motor-generator sets or the like as machines of the so-called "booster" type for effecting acceleration of the main machines, with relatively low or substantially zero rheostatic losses and also to effect predetermined regenerative operation of the main machine.

One object of our present invention is to provide means which shall be relatively simple and inexpensive in construction and effective and reliable in operation for automatically maintaining a predetermined ratio between the supply-circuit voltage and the voltage of one or more coasting dynamo-electric machines, whereby the system is maintained in substantially instant readiness to effect either acceleration or regeneration in accordance with the selection of the train-operator.

More specifically stated, it is an object of our invention to so automatically govern the excitation of the main machines under coasting conditions, and the concurrent excitation of a plurality of auxiliary regulating machines that the system is always ready to practically instantly inaugurate accelerating or regenerative action at the will of the train-operator.

Other minor objects of our invention will become evident from the subsequent detailed description and are fully set forth in the appended claims.

Certain novel features of the hereinafter-described system are the joint invention of R. E. Hellmund, A. J. Hall and L. M. Perkins, and are set forth and claimed in a co-pending application, Serial No. 113,130, filed Aug. 4, 1916, and assigned to the Westinghouse Electric & Manufacturing Company.

Our invention may best be understood by reference to the accompanying drawings, wherein Figure 1 is a diagrammatic view of the main circuits and of a portion of the auxiliary governing circuits embodying our invention; Fig. 2 and Fig. 3 are diagrammatic views of the greater portion of the auxiliary governing circuit connections for manipulating the various pieces of apparatus that are shown in Fig. 1; Fig. 4 is a detailed diagrammatic view of a complete main-circuit switch, as employed in the system of Fig. 1; and Figs. 5 and 6 are simplified diagrammatic views showing the initial main-circuit connections for acceleration and regeneration, respectively.

Referring to Fig. 1 of the drawing, the system shown comprises a plurality of suitable supply-circuit conductors respectively marked "Trolley" and "Ground"; a plurality of main dynamo-electric machines respectively having armatures A1 and A2, main field windings F1 and F2 and auxiliary or commutating field windings C1 and C2, all of the field windings being of the series type; a main-circuit stabilizing resistor R that remains in series relation with the main machines during the greater portion of the operation thereof; a main circuit reversing switch RS, preferably of a familiar electrically controlled type, as indicated in Fig. 2, for reversing the electrical relations of the main field windings F1 and F2 with respect to the corresponding main armatures A1 and A2; a plurality of main-circuit switches of a well-known electrically-controlled type LS, 1, 2, and 3; a motor-generator or booster set that is provided with three mechanically-connected armature windings M, G and E for purposes to be described; a multi-position control drum 4 and an auxiliary two-position control drum 5 that is adapted to be actuated by the main control drum 4 under predetermined conditions; an electrically-controlled pneumatically-operated mechanism 6 for governing the control drums 4 and 5; an auxiliary relay device 7 of the shunt type and a second auxiliary relay device 8 of the series or limit switch type; a coasting relay 9 that is operated in accordance with predetermined conditions to be set forth for automatically governing the operation of the control drums 4 and 5; a suitable source of energy, such as a storage battery B, for supplying energy to the various switch and controller-actuating coils; and an over-load trip and an over-voltage relay of well-known types for performing the usual protective functions.

Inasmuch as the main machines are permanently connected in series relation during both the accelerating and the regenerative period, the main field windings F1 and F2 may be reversed with respect to the corresponding main armatures, when it is desired to operate the vehicle in a reversed direction, by employing only a single set of contact members on the reversing switch in lieu of the duplicate sets that are usually required in prior systems, wherein the familiar "serial-parallel" control is utilized. Although the reversing switch is preferably of a well-known electrically-controlled type, as stated above, for the sake of simplicity and clearness, we have illustrated the reversing switch in a conventional manner and it will be understood that any suitable type of reversing device may be employed.

The motor-generator or booster set comprises the previously-mentioned armature windings M, G and E, which correspond to initial operation as a driving motor, as a generator for supplying energy to the main motors and as an auxiliary exciter for the main field windings. The auxiliary armatures may be mechanically connected in any suitable manner, as by a shaft 10. The auxiliary motor armature M is permanently connected in series relation with the main motors, while the generator armature G is initially connected across the main machines and, at other times, is connected directly to the supply-circuit conductors, as hereinafter set forth in detail.

Although the auxiliary armatures M and G initially operate as a motor and as a generator, respectively, during the latter period of the accelerating period and the first portion of the regenerative period, the functions of the two armatures in question are inter-changed for a purpose to be described. In any case, however, the motor-generator or booster set is continuously operated so long as the line switch LS is closed, irrespective of the main-machine operation, and is preferably employed for other familiar auxiliary purposes such as driving a blower for ventilating the main motors, operating an air-compressor or any other desired use.

The initial circuit connection of the auxiliary generator armature G is established from one brush 11 thereof through conductors 12, 13, 14, 15 and 16 to the higher-voltage terminal of the main armature A1, the circuit being continued through the main armature A1, commutating field winding C1, stabilizing resistor R, switch 3, when closed, commutating field winding C2, main armature A2, switch 2, when in closed position, the actuating coil 18 of the limit switch 8, conductor 19, control fingers 20 and 21 which are bridged by contact segment 22 of the auxiliary control drum 5, conductor 23 and series field winding 24 to the other brush 25 of the armature winding G.

The permanent connections of the exciting armature winding E are completed from one terminal 26 thereof through conductor 27, the switch 3 in its closed position, the main-circuit resistor R, conductor 28, certain contact members (not shown) of the main circuit reversing switch RS, conductor 29, main field winding F1, conductor 30, main field winding F2, conductor 31, other contact members (not shown) of the reversing switch RS and conductor 32 to the negative terminal 33 of the exciting armature winding E.

The auxiliary motor armature M is provided with a series-related field-magnet winding 17 and with a separately-excited field-magnet winding 34, one terminal of which is connected through conductor 35 to the positively-energized conductor 14 and the other terminal of which is connected, through conductor 36, an initially short-circuited portion of an auxiliary resistor 37, control fingers 38 and 39, which are bridged by contact segment 40 of the control drum 4, and conductor 41 to the negative supply-circuit conductor Ground.

In addition to the series-related field winding 24 for the auxiliary generator armature G, a separately-excited field-magnet winding 42 is provided, one terminal of which is connected, through conductor 43, to the conductor 13 and the other terminal of which is connected through conductor 44, control fingers 45 and 46, which are bridged by contact segment 47 of the auxiliary control drum 5, conductor 48 and a portion of the resistor 37 to the negative conductor Ground, as already traced. The exciting armature winding E is provided with a separately excited field-magnet winding 49, one terminal of which is connected, through conductor 50, to a point intermediate the main-circuit switches LS and 1 and the other terminal of which is connected, through conductor 51 and an auxiliary variable resistor 52, to the negatively-connected control finger 38 of the main control drum 4.

The auxiliary control drum 5 is shown as provided with a rack member 53 that is adapted to mesh with a pinion member 54 which has an irregular arrangement of teeth and is adapted to be operated through the agency of a projection or tooth member 55 of the main control drum 4 when the latter is moved from position $f$ to position $g$ or vice versa. In this way, the auxiliary control drum 5 is actuated from its normal or initial position $f'$ to its other positions $g'$. It will be understood that the illustrated mechanism for effecting the desired interoperation of the control drums 4 and 5 may be of any suitable type other than that illustrated.

The main control drum 4 normally occupies an initial position $a$ and is adapted to successively operate through positions $b$ to $p$, inclusive, in accordance with the subsequently described actuation of the operating mechanism 6. The chief function of the main control drum 4 is to vary the active circuit values of the resistor 37 to correspondingly energize the various separately-excited field windings 34, 42 and 49 of the booster set but is also provided with other contact members or electrical interlocks, not all of which are illustrated, for the purpose of governing certain auxiliary circuit connections, as will be set forth in connection with Fig. 2.

The function of the auxiliary control drum 5 is the manipulation of the main-circuit connections of the auxiliary motor armature M and the auxiliary-circuit connections of the auxiliary generator armature G and the separately-excited field winding 42 therefor, in a manner to be described. As previously mentioned, the auxiliary control drum 5 occupies its position $f'$ whenever the main control drum 4 occupies any of its positions $a$ to $f$, inclusive, and assumes its other position $g'$ whenever the main control drum 4 is operating through any of its positions $g$ to $p$.

The operating mechanism 6 is of a familiar electrically-controlled pneumatically-actuated type and comprises a pinion 56 that is secured to one end of the shaft 57 of the main control drum 4 and is adapted to mesh with a horizontally movable rack member 58, to the opposite ends of which a pair of pistons 59 and 60 are respectively attached to operate within suitable cylinders 61 and 62. A valve member 63 is normally open to admit fluid-pressure, from any suitable source, (not shown) through a pipe or passage 65, to the cylinder 61; whereas, a second valve 64 is normally closed to effect communication between the cylinder 62 and the atmosphere, and, only when actuated through the agency of a coil marked "On," is fluid-pressure admitted, from the above-mentioned source, through a pipe or passage 66, to the operating cylinder 62. The other valve 63 is provided with an actuating coil marked "Off" for moving the valve to its other position wherein fluid-pressure is exhausted from the cylinder 61 to the atmosphere.

Assuming that the operating mechanism 6 occupies the position shown wherein the pinions 59 and 60 are biased to their extreme right-hand position by reason of the unbalanced fluid-pressure conditions in the cylinders, the operation of the mechanism 6, without regard to the electrical connections effected by the associated control drums 4 and 5, may be set forth as follows: To produce a forward movement of the main control drum 4, the two actuating coils "On" and "Off" are simultaneously energized, whereupon, fluid-pressure is admitted to the cylinder 62 and is exhausted from the other cylinder 61, in accordance with the above-mentioned operation of the valves 64 and 63, and the pistons 59 and 60 gradually move toward their extreme left-hand positions.

To effect a stoppage of the control drum movement at any time, it is merely necessary to deënergize the "off" actuating coil, whereupon balanced-pressure conditions obtain in the two operating cylinders and the controller movement is effectively and reliably arrested. In actual operation, the energization of the "off" coil is controlled by the limit switch 8, as set forth in detail in connection with Fig. 2.

To return the control drum 4 toward its initial position $a$, both actuating coils "on" and "off" are deënergized, whereupon fluid-pressure conditions in the two operating cylinders revert to the original unbalanced state and the mechanism is actuated toward the illustrated position.

The auxiliary relay device 7 is provided with an actuating coil 70 that is energized or deënergized in accordance with the subsequently described operation of the coasting relay 9 and is provided with coöperating contact member 71 for controlling the energization of the "on" actuating coil, under predetermined conditions to be set forth.

The coasting relay 9 comprises a magnetizable core member 72 of substantially inverted U-shape, having a pair of arms 73 and 74 around which are wound suitable energizing coils 75 ad 76, respectively, which are energized in accordance with the supply-circuit voltage and the combined main-machine voltages, as about to be set forth in detail. An oscillatable rod 77 is adapted to freely swing between the arms 73 and 74 of the coasting relay 9 and is normally held in an intermediate substantially central position y by means of suitable centering springs 78. The rod 77 is provided, near its lower end, with an insulated contact member 79 that is adapted to engage the one or the other of a pair of stationary contact members 80 and 81 when the rod is actuated to its extreme positions x and z, respectively, for governing the operation of the controller-actuating mechanism 6.

An energizing circuit is completed from the positive terminal of the battery B through conductors 82 and 83 and a flexible conducting member 84 to the contact member 79 of the coasting relay 9. The circuit of the actuating coil 75 of the coasting relay is established from the trolley through conductors 84 and 85, the actuating coil 75 and conductor 86 to a point intermediate the switch 2 and the actuating coil 18 of the limit switch 8. The voltage impressed upon the actuating coil 75 is thus, at all times, substantially equal to that portion of the supply-circuit voltage which is applied, or is capable of application, to the main machines. The other actuating coil 76 of the coasting relay 9 is included in a circuit that is completed from the higher voltage terminal of the main armature A1 through conductors 16, 15 and 87, the actuating coil 76, and auxiliary resistor 88 which is adapted to be short-circuited by an interlock 2—out (see also Fig. 4) for a purpose to be described, and conductor 89 to the lower-voltage terminal of the main armature A2. Consequently, the voltage impressed upon the actuating coil 76 is, at all times, substantially equal, or directly proportional, to the voltage generated by the series-connected main machines.

The purpose of the resistor 88 may be described as follows: During coasting periods of the motors, when the main-circuit switches 1 and 2 are open to disconnect the main machines from the supply circuit, in order to reduce the heating of the main field windings F1 and F2 as much as possible and still maintain the system in a condition of instant readiness to perform either accelerating or regenerative operation in accordance with the subsequently described governing action of the coasting relay 9, the auxiliary field-circuit resistor 52 is increased in active value by reason of the removal of a short-circuit of a portion of the resistor by an interlock 2—in, (see also Fig. 4) and the voltage supplied by the exciting armature E to the main field windings F1 and F2 is accordingly reduced. In order to maintain the equilibrium of the oscillatable rod 77 of the coasting relay 9 under the changed conditions, the auxiliary resistor 88 is short circuited by the interlock 2—out, and thus, the effective current traversing the actuating coil 76 of the coasting relay is substantially equal to the corresponding value, if the main-motor field windings were fully energized and the resistor 88 were active, and the operation of the coasting relay is thus not changed by the reduction of current in the main-machine field windings.

Broadly stated, the function of the coasting relay 9 is to maintain the voltage of the series-related main machines, during the coasting period, at a value that corresponds, at all times, to the supply-circuit voltage and thus compensate for changes in vehicle speed by reason of traveling up or down grades or around curves, so that the instant the train operator actuates his master controller (see Fig. 2) to any one of its positions "Brake," "Hold" or "Run," the corresponding main-machine operation will begin, with practically no "time element" of the motors or other portions of the system and without any surge of current to or from the supply circuit. Of course, the voltage of the auxiliary exciting armature E and, consequently, of the main field windings must be increased from the relatively low values employed during coasting; but such action takes place almost instantaneously upon the closure of switch 2 and the resultant re-short-circuiting of a portion of the auxiliary field-circuit resistor 52. The time lag of the selected accelerating or regenerative machine action behind the movement of the master controller is, therefore, negligible.

The automatic action just outlined, which may be termed as anticipatory of any subsequent action of the train operator, is accomplished by means of the control of the "on" and the "off" actuating coils of the operating mechanism 6 through the agency of the co-operating contact members 79, 80 and 81 of the coasting relay.

For example, assuming that the main motors are coasting on a substantially level track or up a slight grade so that the machine speed gradually decreases, or assuming that the supply-circuit voltage suddenly increases, then the action of the machine-voltage-actuating coil 76 of the coasting relay will decrease in either actual or relative strength and the consequent predominance of the other actuating coil 75 will cause the oscillatable arm 77 to assume its position x, whereupon a circuit is completed from the positively-energized contact member 79 through control finger 80, the actuating coil 70 of the auxiliary relay device 7 and conductor 90 to the negative terminal of the battery B. The auxiliary relay device 7 is thus actuated to its upper or inoperative position to deënergize the circuit of the "on" actuating coil, which was previously completed from the positively energized conductor 82 through the coöperating contact members 71 of the relay device 7, interlock 1—out, the purpose of which will be described in connection with Fig. 2, conductor 91, the actuating coil "On" and conductor 92 to the negative battery terminal.

The consequent deënergization of the "on" actuating coil in conjunction with the action of the already deënergized other valve 63 causes an immediate return of the main control drum 4 toward its initial position $a$ to thus, for example, gradually decrease the voltage of the auxiliary generator armature G and simultaneously increase the electromotive force of the auxiliary motor armature M which is connected in series relation with the main machines, and thereby produce a condition in the system that corresponds to a substantial balancing of the supply circuit voltage with the generated voltage of the main machines in conjunction with the series-related auxiliary armature M, whereupon the forces exerted by the two actuating coils 75 and 76 of the coasting relay 9 are again balanced and the oscillatable rod 77 assumes its intermediate position.

On the other hand, if the vehicle strikes a down grade, for example, or if, by reason of supply-circuit voltage fluctuations, the generated voltage of the main machines, while coasting, rises above the proper value with respect to the simultaneous supply-circuit voltage value, then the machine-voltage-actuating coil 76 of the coasting relay predominates over the supply-circuit-voltage-actuating coil 75 and the oscillatable arm 77 is moved to its extreme right-hand position $z$ to complete a circuit from the positively-energized contact member 79 of the relay through control finger 81, conductor 93, coöperating contact members 94 of the limit switch 8 in its lower position, conductor 95, the actuating coil "off" and conductor 96 to the negative conductor 92. Thus, the "off" actuating coil is energized simultaneously with the already normally energized actuating coil "On" and a movement of the main control drum 4 toward its final operating position $p$ occurs, whereby the energizations of the several field windings of the booster set are varied to effect a reduction of the voltage generated by the coasting main machines until balanced conditions again obtain, whereupon the oscillatable arm 77 of the coasting relay again assumes its intermediate position.

Consequently, the coasting relay 9 automatically compensates for the changes in grades or curves of the track and also for the unavoidable fluctuations of supply-circuit voltage and maintains a balance between the generated voltage of the coasting main machines and the supply circuit at all times, to permit the above-mentioned substantially immediate response of the machine to the operation of the master controller to any of its operative positions.

The over-voltage relay may be of any suitable type and, as illustrated in Fig. 2, is adapted to open the main-circuit switch 2 under predetermined abnormally high-voltage conditions, whereby the main machines and the booster machines are prevented from building up an excessively high voltage, through dynamic braking action, which would tend to injure or destroy the various machines, by "flash-over" troubles, or otherwise, as will be understood.

Reference may now be had to Fig. 2 which illustrates, in addition to the various actuating coils and the auxiliary contact members of the relay device that are shown in Fig. 1, a master controller MC that is adapted to occupy an "off" position and a plurality of operative positions respectively marked "Brake", "Hold" and "Run" for correspondingly governing the main-machine operation; a master reverser MR of a familiar type for governing the actuating coils $f''$ and $r''$ of the main-circuit reversing switch RS; a plurality of train line conductors TL for connecting various auxiliary circuits with the master controller and for adapting the system to multiple-unit operation, in accordance with a familiar practice; and a plurality of electrical interlocks or contact members of a well-known type that are illustrated in connection with the switch 2 in Fig. 4. Since the interlocks just mentioned are old and familiar in the art, no further description or illustration thereof is believed to be necessary.

The supply-circuit switch LS is not governed by the master controller, but is normally closed at all times in accordance with a circuit that is completed from the trolley (see Fig. 3) through a suitable cut-out switch 100, a control resistor 101, the auxiliary contact member 102 of the overload trip which thus controls the connection of the main machine to the supply circuit, the actuating coil of the switch LS, conductor 103, switch interlock LS—out and 1—out, interlock 4—$a$ of the main control drum 4 in its initial operative position $a$ and conductors 104 and 105 to the negative supply-circuit conductor Ground. Upon the closure of the switch LS, a holding circuit therefor is completed from the conductor 103 through an auxiliary resistor 106, whereby the current consumed by the actuating coil circuit of the switch LS is reduced during the time that the switch is closed, interlock 107—LS—in and conductor 108 to the negative conductor 105.

Assuming that the supply-circuit switch

LS is closed and that the various portions of the apparatus occupy the positions shown in Fig. 1 and Fig. 2, the acceleration of the main machines may be effected by actuating the master controller MC to its final operating position "Run," whereupon a circuit is completed from the positive terminal of the battery B through conductors 110 and 111, control fingers 112, and 113, which are bridged by contact segment 114 of the master controller, conductor 115, control fingers 116 and 117, which are bridged by contact segment 118 of the master reverser in its forward position, conductor 119, train-line conductor 120, conductor 121, contact member 122 of the main reversing switch RS in its forward position, conductors 123, 124 and 125, where the circuit divides, one branch including conductor 126, the actuating coil of the switch 1, and conductor 127, and the other branch including interlock 4—a, conductor 128, the actuating coil of the switch 3 and conductor 129, whence a common circuit is completed through conductors 130 and 131, train-line conductor 132 and conductor 133 to the negative terminal of the battery B.

Another circuit is simultaneously established from the contact segment 114 of the master controller through control finger 134, conductor 135, train-line conductor 136, conductor 137, coöperating contact members 138 of the over voltage relay, the actuating coil of the switch 2, conductor 139, interlock 9—y of the coasting relay 9 in its intermediate or neutral position y, and conductor 140 to the negative conductor 130. The purpose of the interlock 9—y is to prevent the switch 2 from closing unless the previously mentioned balanced-voltage conditions obtain with respect to the supply-circuit voltage and the generated voltage of the main machines during the coasting period. Upon the closure of switch 2, a holding circuit therefor is formed by the bridging of the interlock 9—y by an interlock 2—in.

Referring temporarily to Fig. 1, the main circuits completed by the closure of switches 1, 2 and 3 may be traced as follows: from the trolley through the actuating coil of the overload trip, switch LS, conductor 141, switch 1, main armature A1, commutating field winding C1, stabilizing resistor R, switch 3, commutating field winding C2, main armature A2, switch 2, the actuating coil 18 of the limit switch 8, conductor 19, control fingers 20 and 21, which are bridged by the contact segment 22 of the auxiliary control drum 5 in its position f', conductor 142, series field winding 17 and auxiliary armature winding M, conductor 144, control fingers 145 and 146, which are bridged by contact segment 147 of the auxiliary control drum 5, and conductors 148, 149 and 150 to the negative conductor Ground. The initial main-circuit connections are more simply shown in Fig. 5.

In the initial operating position a of the main control drum 4, the resistance of the circuit of the field winding 42, which corresponds to the generating armature G, equals its maximum value by reason of the relation of the resistor 37 to the movable contact members of the main control drum 4. On the other hand, the energization of the separately-excited field winding 34 for the auxiliary motor armature M is at its maximum by reason of the direct connection of the field winding through the contact members of the main control drum 4 to the negative conductor Ground.

Under the starting conditions just outlined, the auxiliary motor armature M absorbs substantially all of the supply-circuit voltage and the main machines are thus gradually started into operation as the voltage of the armature M is decreased by reason of the actuation of the main control drum 4, which actuation simultaneously increases the voltage of the auxiliary generator armature winding G, the same resistor 37 being employed for the increasing and decreasing actions just mentioned. The excess of energy over that actually required by the various main and auxiliary machines is returned to the supply circuit through the agency of the generator armature winding G.

To effect the forward operation of the main control drum 4, one circuit is completed from the contact segment 114 of the master controller MC, through control finger 151, conductor 152, train-line conductor 153, conductor 154, actuating coil 155, of a relay device marked "Regen. relay" and conductor 156 to the negative conductor 131. The actuation of the regenerative relay to its upper position completes a circuit from the conductor 154, through conductor 157, coöperating contact members 158 of the relay, conductors 159, 160 and 91, the actuating coil "On" of the main control drum 4 and conductor 92 to the negative conductor 130.

In addition to the function just described, the regenerative relay is adapted, in its upper position, to remove a short-circuit from a portion of the auxiliary resistor 52 that is included in circuit with the separately-excited field winding 49 of the exciting armature E (see Fig. 1). Thus, whenever, the master controller occupies its positions "Run" or "Hold", the regenerative relay occupies its upper position, and the energization of the field winding 49 of the exciting armature E is correspondingly reduced by the insertion of a portion of the resistor 52. On the other hand, whenever the master controller occupies its position "Brake", the regenerative relay is deënergized and drops to its lower position wherein the above-mentioned portion of the resistor 52 is again short-circuited. In other words, the regenerative relay acts to weaken the main motor field winding excitation during the accelerating period and to strengthen such excitation during regenerative operation.

Another circuit is completed at this time from the contact segment 114 of the master controller through control finger 161, conductor 162, train-line conductor 163, conductors 164 and 93, the coöperating contact members 94 of the limit switch 8, conductor 95, the actuating coil "Off" of the main control drum 4 and conductor 96 to the negative conductor 130.

Since both actuating coils of the operating mechanism 6 are simultaneously energized, the main control drum 4 will move forward in accordance with the position of the limit switch 8, or, in other words, will maintain a substantially constant accelerating current.

The forward operation of the main control drum to its second position $b$ effects the separation of control finger 165, which is directly connected to the separately-excited field-magnet winding 34 for the armature M of the booster set, from contact segment 166 of the main control drum 4, while an additional control finger, which is connected to another intermediate point of the resistor 37, engages contact segment 166. A certain section of the resistor 37 is thus included in circuit with the field winding 34 for the armature M whereas, the same section is simultaneously excluded from the circuit of the separately-excited field winding 42 for the auxiliary generator armature winding G. Similar results obtain from the step-by-step movement of the main control drum 4 to its position $f$, wherein the resistance in circuit with the generator field winding 42 is completely short-circuited and a maximum section of the resistor 37 is included in circuit with the motor field winding 34. Thus the voltage of the auxiliary motor armature M is reduced to substantially zero in a gradual manner and, simultaneously, the voltage of the generator armature G and of the parallel circuit comprising the two main machines, is increased to substantially supply-circuit voltage, so that, assuming a supply-circuit voltage of 600 volts, approximately 300 volts is impressed across each main machine, corresponding to full-series operation of the motors in the customary "series-parallel" control system.

As the main control drum 4 is moved from position $f$ to position $g$, no circuit changes are effected thereby, but the auxiliary control drum 5 is actuated to its other position $g'$ by means of the rack-and-pinion connection between the two drums, as hereinbefore set forth. One result of this actuation of the auxiliary drum 5 is to complete a circuit from the series field winding 24 of the auxiliary generator armature G through conductor 23, control finger 21, conductor 168, control finger 169, contact member 147 and conductors 148, 149 and 150 to the negative conductor Ground, whereby the auxiliary generator armature G and its series field winding 24 are connected directly across the supply circuit.

Another change effected by the actuation of the auxiliary control drum 5 to its position $g'$ is the completion of a circuit from the actuating coil 18 of the limit switch 8 through conductor 19, control finger 20 and contact segment 22 of the control drum 5, conductor 170, contact segment 171, control finger 145, conductor 144, the auxiliary motor armature M, series field winding 17, conductor 142 and thence, through conductor 168, as just traced out. Thus, the auxiliary motor armature M and its series field 17 are momentarily short-circuited when the voltage thereof is negligible, and are then reconnected in series relation with the main machines but with a reversed connection.

A still further change of circuits is accomplished at this time by reason of the connection of one terminal of the separately-excited field winding 42 for the auxiliary generator armature G through conductor 44, control fingers 45 and 172, which are bridged by contact segment 47 of the auxiliary control drum 5, and conductor 173 to the negative conductor 150, whereby the separately-excited field winding 42 is connected directly across the supply circuit.

Thus, the auxiliary generator armature G from this time on throughout acceleration acts as a substantially constant-speed motor for driving the auxiliary armature M as a negative booster to supply a gradually increasing electromotive-force that is below the potential of the negative supply-circuit conductor Ground, and also for driving the exciting armature E.

As the main control drum 4 is actuated through positions $h$ to $l$, inclusive, the reversed action of the resistor 37, with respect to the auxiliary motor armature M, is effected, that is to say, the resistor is gradually excluded from the circuit of the separately excited field winding 34 for the auxiliary armature M until in position $l$, maximum excitation thereof again occurs as was the case in position $a$. At this time, therefore, the voltage of the armature M is substantially equal and in the same direction with the supply-circuit voltage so that, in case of a trolley voltage of 600 volts, such voltage is impressed upon one of the main machines and a substantially equal voltage is impressed from the auxiliary armature M upon the other main machine, thus giving the equivalent of a full-parallel connection in a system of the familiar "series-parallel" type.

In positions $m$, $n$ and $o$, the energization of the separately-excited field winding 49 for the exciter armature E is gradually decreased by reason of successively including section of the resistor 37 in circuit therewith through the agency of control fingers 174 and the contact segment 166, and thus the excitation of the main field windings F1 and F2 is correspondingly gradually decreased to produce the well-known results of "field control", namely, a higher main-machine speed.

The weakening of the main field-winding excitation is continued in position $p$ of the main control drum 4 by the opening of the switch 3, whereby the stabilizing resistor R is open-circuited and the main field windings F1 and F2 are connected in straight series relation with the corresponding main armature windings, the proportion of parts being such that the opening of the switch 3 effects a suitable decrease of the current traversing the main field windings and thus produces the desired result of increased speed.

The opening of the switch 3 is effected by reason of the disengagement of a contact member "4—$b$ to $o$" from the corresponding auxiliary control fingers of the main control drum 4, such connection having been maintained from the position $b$ to the position $o$ by reason of the completion of a circuit from the positive terminal of the battery B through conductors 110 and 175, train-line conductor 176, conductors 177 and 178, the interlock "4—$b$ to $o$", and conductors 179 and 128 to the actuating coil of the switch 3. The closure of the switch 3 and the consequent energization of the main field windings F1 and F2 from the exciting armature E is thus insured during the coasting period of the main machines, irrespective of the operation of the master controller.

Regenerative operation is obtained by merely operating the main control drum 4 through its positions $p$ to $a$, inclusive, or, in other words, by exactly reversing the positions that were employed during accelerating operation. The initial regenerative main-circuit connections are illustrated in a simplified manner in Fig. 6.

In general, the main field winding is connected in circuit with the auxiliary exciting armature E and the stabilizing resistor R, the field excitation of the exciting armature is strengthened to compensate for a predetermined decrease of main-machine speed, the voltage of the auxiliary armature winding M, acting as a generator, is gradually reduced to zero while the remaining auxiliary armature winding G, acting as a motor, is connected across the supply circuit, the armature winding M is then reversed and acts as a motor to gradually absorb increasing amounts of the supply-circuit voltage, while the armature winding G is connected, as a generator, in parallel relation to the main machine, until the speed thereof decreases to substantially zero and the auxiliary armature winding M absorbs substantially the entire supply-circuit voltage, which occurs when the main control drum 4 reaches its position $a$. Inasmuch as the regenerative operation of the system is exactly the reverse of the accelerating operation, it is not thought necessary to describe the regenerative operation in detail.

However, a brief exposition of the operation of the main controlling device 4 will be given. During regeneration, the regenerative relay occupies its lower position by reason of the deënergization of conductor 154 when the master controller is moved to the "brake" position. The energizing circuit of the "on" actuating coil is then completed from conductor 124, through coöperating contact members 185 of the limit switch 8 in its upper position to conductor 160. Since the "off" actuating coil is energized through the contact members 94 of the limit switch 8 in its lower position, it follows that the necessary simultaneous deënergization of the two coils, in question to effect backward step-by-step movement of the control drum 4, as the main machine speed decreases, is dependent upon the intermittent action of the limit switch.

Furthermore, the function of the contact member or interlock 4—$p$ that is connected in circuit with the actuating coil of the switch 2 will be explained. In case the vehicle is coasting, and, by reason of traveling down a grade, attains a speed that is higher than the normal speed that corresponds to the final accelerating position $p$ of the main control drum 4, then the coasting relay 9 will automatically act to energize the "off" actuating coil, as previously described, in an attempt to decrease the generated voltage of the momentum-driven machines, which voltage, for the time being, predominates over the simultaneous supply-circuit voltage value. Since the main control drum already occupies its final position, no further movement thereof in the desired direction is possible and, therefore, the oscillatable arm 77 of the coasting relay 9 will remain in its position $z$ until the vehicle speed decreases to the normal maximum value.

However, if it should be desired to effect regenerative braking under such over-speed conditions, this result may be accomplished, even though the interlock 9—$y$ is excluded from the circuit of the actuating coil of the switch 2, by means of the completion of the circuit in question through the interlock 4—$p$, whereupon regenerative action begins and the operation of the system from that time on is similar to that already set forth.

The purpose of the interlock 1—out that is in circuit with the auxiliary contact members 71 of the relay device 7 will now be explained. Under accelerating or regenerative conditions, the circuit in question is inoperative by reason of the closure of the switch 1. When the main machines are coasting, however, the interlock 1—out and the auxiliary contact members 71, in the closed position, complete the circuit of the "on" actuating coil, which is then governed by the coasting relay 9, as previously set forth.

It will be seen that there is thus provided a relatively simple, effective and reliable control system for accomplishing economical acceleration of a plurality of permanently-series-connected main dynamo-electric machines through the agency of a motor-generator or booster set, two of the armature windings of which initially are connected in series relation with, and in parallel relation to, the main machines, to act as a motor and a generator, respectively; the auxiliary motor armature then is converted to a generator of electro-motive force below the negative voltage of the supply circuit, while the former auxiliary generator becomes a driving motor therefor. Thus, the equivalent of "series parallel" control is obtained, in that the main machines eventually have a voltage impressed upon each of them that is substantially equal to the supply-circuit voltage. Further operation of the main machines, in either the accelerating or regenerative periods, is effected by varying the excitation of an auxiliary exciting armature that is connected to energize the main field windings in the same direction during both acceleration and regeneration, whereby no reversal of the main field windings with respect to the main armature is necessary when passing from acceleration to regeneration or vice versa.

Broadly stated, therefore, one phase of the herein-described inventions comprises a method of operation of a driving unit comprising one or more main dynamo-electric machines by gradually impressing thereon an increasing proportion of the supply-circuit voltage, next creating an electromotive-force below the negative voltage of the supply circuit and then gradually algebraically subtracting the negative electromotive force from the supply-circuit voltage to thus impress an increasingly greater effective voltage upon the main machines.

Stated another way, the initial accelerating connections employ the supply-circuit conductors as a "two-wire" circuit, and subsequently the equivalent of a "three-wire" system is created that utilizes the negative or "ground" conductor of the supply circuits as the "neutral wire."

Other advantages of the above-described system of control may be set forth as follows: Although during the latter part of the accelerating period and the first portion of the regenerative period, the equivalent of 1200-volt operation is obtained, yet the voltage between any part of either motor and the negative or ground voltage is not more than 600 volts. Thus the machines need to be insulated to withstand only the latter potential, or, in other words, the machines may be of the standard 600-volt type.

It is estimated that the total capacity of the three booster armature windings need be approximately only 75% of the combined capacity of the main machines, by reason of the fact that the current in the auxiliary armature winding M varies between zero and the main-machine current, the average current carried by the auxiliary armature G is somewhat less, and the current furnished by the exciter armature E is produced at a relatively low voltage, as will be understood, thereby reducing the actual watt capacity of the exciting armature.

Whereas, the prior regenerative systems wherein a separately-excited field winding alone is employed, are capable of regenerating down to about 8 or 10 miles per hour, the present system will permit regeneration to substantially zero speed. Moreover, the rheostatic losses occuring in the usual motor-control system are practically eliminated, and the present control system, in general, is less complicated and, therefore, less expensive in first cost and maintenance than prior fully automatic regenerative systems of which we have any knowledge.

It will be understood that various modifications in the above-described system may be effected without departing from the spirit and scope of the herein-described inventions. For example, if desired, the field winding, instead of the armature winding of the auxiliary armature M, may be reversed to effect the desired negative booster action and the field excitation of the auxiliary armature winding G may be varied when the armature is acting as a driving motor.

Moreover, as is well known, in regenerative operation during relatively high machine speeds, the main field-winding excitation requisite to provide the desired regenerative voltage is necessarily somewhat weak, which, in turn, means relatively heavy armature current and excessive armature heating, as well as undesirable ratios of field winding and armature fluxes, with the consequent tendency toward undesirable magnetic conditions such as leads to sparking and "flash-over" difficulties. In systems wherein it is desired to minimize the possibility of such conditions, the main machines may initially be connected in parallel relation during the regenerative period and be subsequently changed over to series connection, whereas, during the accelerating period, the machines are permanently connected in series relation. However, the modification just recited is not herein illustrated as it forms no part of our present invention but is fully shown and described and claimed in a copending application of A. L. Broomall and R. E. Ferris, Serial No. 59,992, filed November 6, 1915, and assigned to the Westinghouse Electric & Manufacturing Company.

It is our intention in the appended claims to cover all the modifications of certain portions of the hereinbefore-described system that rightfully fall within the spirit and scope of our present invention.

We claim as our invention:

1. In a system of control, the combination with a supply circuit and a dynamo-electric machine adapted for both accelerating and regenerative operation, of means comprising a movable control member operative under predetermined machine conditions for maintaining the system in substantially instant readiness to effect either selected operation.

2. In a system of control, the combination with a supply circuit and a dynamo-electric machine adapted for both accelerating and regenerative operation, of means operative under coasting conditions of the machine to maintain a predetermined ratio between the supply-circuit voltage and the machine voltage, whereby the system is maintained in substantially instant readiness to effect either acceleration or regeneration.

3. In a system of control, the combination with a supply circuit and a dynamo-electric machine adapted for both accelerating and regenerative operation, of means for governing certain circuit connections during machine operation, and means for maintaining said governing means in readiness to effect substantially immediate accelerating or regenerative action of the machine.

4. In a system of control, the combination with a supply circuit and a dynamo-electric machine adapted for both accelerating and regenerative operation, of means dependent upon relative concurrent values of supply-circuit voltage and machine voltage for maintaining the system in substantially instant readiness to effect either selected operation.

5. In a system of control, the combination with a supply circuit and a dynamo-electric machine adapted for both accelerating and regenerative operation, of means operative in accordance with the machine speed for maintaining the system in substantially instant readiness to effect either accelerating or regenerative operation.

6. In a system of control, the combination with a supply circuit and a dynamo-electric machine adapted for both accelerating and regenerative operation, of means operative under coasting conditions of the machine for maintaing the system in substantially instant readiness to effect regenerative operation.

7. In a system of control, the combination with a supply circuit and a dynamo-electric machine adapted for both accelerating and regenerative operation, of means operative under coasting conditions of the machine to maintain a predetermined ratio between the supply-circuit voltage and the machine voltage, whereby the system is maintained in substantially instant readiness to effect regenerative operation.

8. In a system of control, the combination with a supply circuit and a dynamo-electric machine adapted for both accelerating and regenerative operation, of means dependent upon relative concurrent values of supply-circuit voltage and machine voltage for maintaining the system in substantially instant readiness to effect regenerative operation.

9. In a system of control, the combination with a supply circuit and a dynamo-electric machine adapted for both accelerating and regenerative operation, of means operative in accordance with the machine speed for maintaining the system in substantially instant readiness to effect regenerative operation.

10. In a system of control, the combination with a supply circuit and a dynamo-electric machine adapted for both accelerating and regenerative operation, of means for governing certain circuit connections during machine operation, and means for maintaining said governing means in readiness to effect substantially immediate regenerative action of the machine.

11. In a system of control, the combination with a supply circuit and a dynamo-electric machine adapted for both accelerating and regenerative operation, of a controlling device governing the excitation of the main machine, and means for manipulating said controlling device under coasting conditions of the machine to maintain the generated voltage thereof in such proportion to the concurrent supply-circuit voltage that substantially immediate regenerative action of the machine may be effected at any time.

12. In a system of control, the combination with a supply circuit and a dynamo-electric machine adapted for both accelerating and regenerative operation, of a multi-position controlling device governing the excitation of the main machine, and means for effecting the actuation of said device in the one or the other direction in accordance with variations of machine speed to maintain the generated machine voltage in such proportion to the concurrent supply-circuit voltage that substantially immediate regenerative action of the machine may be effected at any time.

13. In a system of control, the combination with a supply circuit and a dynamo-electric machine adapted for both accelerating and regenerative operation, of a multi-position controlling device governing the excitation of the main machine, and means actuated in accordance with the relative concurrent values of supply-circuit voltage and machine voltage to effect the operation of said device in the one or the other direction to maintain the generated machine voltage in such proportion to the concurrent supply-circuit voltage that substantially immediate regenerative action of the machine may be effected at any time.

14. In a system of control, the combination with a supply circuit and a dynamo-electric machine adapted for both accelerating and regenerative operation, of a multi-position controlling device governing the excitation of the main machine, an electrically-controlled mechanism for operating said device, and relay means actuated in accordance with the relative concurrent values of supply-circuit voltage and machine voltage for energizing said electrically-controlled mechanism to effect movement thereof in the one or the other direction to maintain the generated machine voltage in such proportion to the concurrent supply-circuit voltage that substantially immediate regenerative action of the machine may be effected at any time.

15. In a system of control, the combination with a supply circuit and a dynamo-electric machine adapted for both accelerating and regenerative operation, of a multi-position controlling device governing the excitation of the main machine, and means for effecting the actuation of said device in the one or the other direction in accordance with variations of machine speed to maintain the generated machine voltage in such proportion to the concurrent supply-circuit voltage that substantially immediate accelerating or regenerative action of the machine may be selectively obtained at any time.

16. In a system of control, the combination with a supply circuit and a dynamo-electric machine adapted for both accelerating and regenerative operation, of a multi-position controlling device governing the excitation of the main machine, and means actuated in accordance with the relative concurrent values of supply-circuit voltage and machine voltage to effect the operation of said device in the one or the other direction to maintain the generated machine voltage in such proportion to the concurrent supply-circuit voltage that substantially immediate accelerating or regenerative action of the machine may be selectively obtained at any time.

17. In a system of control, the combination with a main dynamo-electric machine adapted for both accelerating and regenerative operation, of a plurality of auxiliary machine armature windings respectively connected in series relation with and in parallel relation to, the main machine, controlling means for governing the excitation of the auxiliary machines to effect operation of the main machine, and means for effecting the actuation of said controlling means in the one or the other direction in accordance with variations of machine speed to maintain the generated machine voltage in such proportion to the supply-circuit voltage that substantially immediate regenerative action of the main machine may be effected at any time.

18. In a system of control, the combination with a main dynamo-electric machine adapted for both accelerating and regenerative operation, of a plurality of auxiliary machine armature windings respectively connected in series relation with and in parallel relation to, the main machine, and in circuit with the main-machine field winding, a controlling device for governing the excitation of the auxiliary machines to effect operation of the main machine, and means actuated in accordance with the relative concurrent values of supply-circuit voltage and machine voltage to effect the operation of said device in the one or the other direction to maintain the generated machine voltage in such proportion to the concurrent supply-circuit voltage that substantially immediate regenerative action of the main machine may be effected at any time.

19. In a system of control, the combination with a main dynamo-electric machine adapted for both accelerating and regenerative operation, of a plurality of auxiliary machine armature windings respectively connected in series relation with, and in parallel relation to, the main machines, controlling means for governing the excitation of the auxiliary machines to effect operation of the main machine, a master controller for normally governing the main-machine connections and said controlling means and adapted to occupy an "off", a "run" and a "brake" position, and a relay device operable when the master controller occupies its "off" position and the main machine is coasting to effect the actuation of said controlling means in the one or the other direction in accordance with variations of machine speed to maintain the generated machine voltage in such proportion to the supply-circuit voltage that substantially immediate accelerating or regenerative action of the main machine may be effected at any time upon movement of the master controller to the "run" or the "brake" position, respectively.

20. In a system of control, the combination with a main dynamo-electric machine adapted for both accelerating and regenerative operation, of a plurality of auxiliary machine armature windings respectively connected in series relation with, and in parallel relation to, the main machines, controlling means for governing the excitation of the auxiliary machines to effect operation of the main machine, a master controller for normally governing the main-machine connections and said controlling means and adapted to occupy an "off", a "run" and a "brake" position, and a relay device operable when the master controller occupies its "off" position and the main machine is coasting to effect the actuation of said controlling means in the one or the other direction in accordance with the relative concurrent values of supply-circuit voltage and machine voltage to maintain said voltages in such proportion that substantially immediate accelerating or regenerative action of the main machine may be effected at any time upon movement of the master controller to the "run" or the "brake" position, respectively.

21. In a system of control, the combination with a supply circuit and a dynamo-electric machine adapted for both accelerating and regenerative operation, of a main-circuit switching device, a multi-position controlling device governing the excitation of the main machine, controlling means for effecting the actuation of said device in the one or the other direction in accordance with variations of machine speed to maintain the generated machine voltage in a predetermined ratio to the supply-circuit voltage, and means associated with said controlling means for preventing the closure of said main-circuit switching device unless said ratio obtains.

22. In a system of control, the combination with a supply circuit, and a main dynamo-electric machine adapted for both acceleration and regeneration, of a plurality of auxiliary dynamo-electric machines for varying the applied voltage and field-winding excitation of the main machine, a main-circuit switching device, a multi-position controlling device for governing the excitation of the auxiliary machines, a three-position relay device biased to an intermediate position and actuated to the one or the other of its outer positions in accordance with the relative concurrent values of supply-circuit voltage and machine voltage to effect the operation of said controlling device in the one or the other direction to maintain a predetermined ratio of said voltages, and interlocking means for preventing the closure of said main switching device unless said relay device occupies its intermediate position.

23. In a system of control, the combination with a supply circuit and a dynamo-electric machine adapted for both accelerating and regenerative operation, of a main-circuit switching device, a multi-position controlling device governing the excitation of the main machine, a three-position relay device biased to an intermediate position and actuated to the one or the other of its outer positions in accordance with the relative concurrent values of supply-circuit voltage and machine voltages to effect the operation of said controlling device in the one or the other direction to maintain a predetermined ratio of said voltages, interlocking means for preventing the closure of said main-circuit switching device unless said relay device occupies its intermediate position, and means operable in a certain position of said controlling device to effect the closure of the main-circuit switching device irrespective of the position of said relay device.

24. In a system of control, the combination with a supply circuit and a dynamo-electric machine adapted for both accelerating and regenerative operation, of a main-circuit switching device, a multi-position controlling device governing the excitation of the main machine, a relay device actuated in accordance with the relative concurrent values of supply-circuit voltage and machine voltage for effecting the actuation of said controlling device in the one or the other direction to maintain a predetermined ratio of said voltages under coasting conditions of said machine, a master controller for normally governing the main-circuit switching device and the controlling device, and means operable in predetermined positions of the controlling device for maintaining said switching device closed irrespective of the master controller.

25. In a system of control, the combination with a supply circuit and a dynamo-electric machine adapted for both accelerating and regenerative operation, of an auxiliary source of energy, a switching device for connecting said source of energy in circuit with the main machine field winding, a multi-position controlling device governing the active value of said source of energy, a relay device actuated in accordance with the relative concurrent values of supply-circuit voltage and machine voltage for effecting the actuation of said controlling device in the one or the other direction to maintain a predetermined ratio of said voltages under coasting conditions of said machine, a master controller for normally governing the switching device and the controlling device, and contact means operable in nearly all of the controlling device positions for maintaining said switching device closed irrespective of the master controller, whereby the main-field-winding excitation is maintained during coasting periods.

26. In a system of control, the combination with a supply circuit and a dynamo-electric machine adapted for both accelerating and regenerative operation, of an auxiliary source of energy, a switching device for connecting said source of energy in circuit with the main machine field winding, a multi-position controlling device governing the active value of said source of energy, a relay device actuated in accordance with the relative concurrent values of supply-circuit voltage and machine voltage for effecting the actuation of the said controlling device in the one or the other direction to maintain a predetermined ratio of said voltages under coasting conditions of said machine, means independent of the controlling device for reducing the active value of said source of energy during coasting periods, and means for correspondingly increasing the said "machine voltage" applied to said relay device.

27. In a system of control, the combination with a supply circuit and a dynamo-electric machine adapted for both accelerating and regenerative operation of an auxiliary exciting machine for the main machine field winding, a multi-position controlling device governing the field excitation of said auxiliary machine, a relay device actuated in accordance with the relative concurrent values of supply-circuit voltage and main machine voltage for effecting the actuation of said controlling device in the one or the other direction to maintain a predetermined ratio of said voltages under coasting conditions of the main machine, switching means independent of the controlling device for reducing the excitation of said auxiliary machine during coasting periods, and means for correspondingly increasing the said "machine voltage" applied to said relay device.

In testimony whereof, we have hereunto subscribed our names this 2nd day of August, 1916.

ARTHUR J. HALL.
LAURENCE M. PERKINS.